United States Patent [19]
Law et al.

[11] Patent Number: 5,639,093
[45] Date of Patent: Jun. 17, 1997

[54] CASTING TARGET

[76] Inventors: Ben Law, 8254 S. Yukon, Tulsa, Okla. 74132-3102; Jeffrey Miller, 820 Laurel Oaks Cir., Sapulpa, Okla. 74066

[21] Appl. No.: 637,157

[22] Filed: Apr. 24, 1996

[51] Int. Cl.$^6$ ............................................. F41J 5/18
[52] U.S. Cl. ....................... 273/371; 273/140; 273/381
[58] Field of Search .................... 273/371, 377, 273/381, 140

[56] References Cited

U.S. PATENT DOCUMENTS

| | | | |
|---|---|---|---|
| 2,230,814 | 2/1941 | Roth | 273/381 X |
| 2,320,145 | 5/1943 | La Due | 273/102 |
| 2,598,487 | 5/1952 | Anechiarico | 273/140 |
| 2,703,469 | 3/1955 | Raizen | 46/92 |
| 2,909,868 | 10/1959 | Lewis | 273/140 X |
| 3,024,025 | 3/1962 | Richardson et al. | 273/377 X |
| 3,463,494 | 8/1969 | Stroh | 273/101 |
| 3,645,536 | 2/1972 | Tierney | 273/371 X |
| 4,976,439 | 12/1990 | Kraemer | 273/350 |
| 5,110,136 | 5/1992 | Land | 273/346 |
| 5,297,355 | 3/1994 | O'Brien | 273/377 X |
| 5,397,131 | 3/1995 | Kraemer | 273/350 |

*Primary Examiner*—William H. Grieb
*Attorney, Agent, or Firm*—Fellers, Snider, Blankenship, Bailey & Tippens

[57] ABSTRACT

The present invention provides a casting target and a casting practice method. The inventive casting target comprises a receiving structure for receiving an object cast at the target and an indicator assembly for indicating that the object has been received by the receiving structure. The inventive method comprises the step of casting an object attached to a line at the receiving structure of the inventive casting target.

15 Claims, 3 Drawing Sheets

5,639,093

CASTING TARGET

FIELD OF THE INVENTION

The present invention relates to targets and methods for practicing casting.

BACKGROUND OF THE INVENTION

U.S. Pat. No. 3,463,494 discloses a practice device for catching fish. The device includes a trough which contains a magnetized tail portion of an artificial fish. The fish is attached to a spring-biased take-up reel. The head portion of the artificial fish is attached to the fisherman's line. When the head portion of the artificial fish is cast into the trough, the head portion becomes magnetically attached to the tail portion. The fisherman then reels in the artificial fish against the resistance exerted by the spring-biased take-up reel.

U.S. Pat. No. 5,110,136 discloses a casting practice device wherein a projectile attached to the end of a fishing line is cast towards a target fish. The projectile comprises a VELCRO material which operates in conjunction with a corresponding piece of VELCRO material attached to the target fish for securing the projectile to the fish.

U.S. Pat. No. 5,397,131 discloses a yard casting assembly which includes: a fishing line, a lure attached to the end of the fishing line, and an artificial fish having a hook-shaped member attached thereto for receiving the lure and thereby securing the target member to the fishing line.

U.S. Pat. No. 2,320,145 discloses a moving target fish for use in water. When using the target fish, the fisherman attempts to hook a floating cord attached to the target fish.

U.S. Pat. No. 4,976,439 discloses a yard casting assembly wherein a wedge member is cast toward a target having peg-type members projecting from the upper surface thereof. The fisherman attempts to place the casting wedge between the peg-type members.

U.S. Pat. No. 2,598,487 discloses a fishing game wherein a fishing line having a magnet attached thereto is used to catch an artificial fish. The artificial fish includes a hinged mouth having metallic plates therein to which the magnet becomes attached. The attachment of the magnet to the metallic plates causes the mouth of the fish to close.

U.S. Pat. No. 2,703,469 discloses a floating toy fish which may be caught by engaging a hook in the mouth thereof.

A need presently exists for an effective casting target which remains in place when "caught" so that the fisherman can quickly and repeatedly practice the casting motion without having to return the target to its original position. A need also exists for a practice casting system which is fun for fisherman of all ages so that fisherman are encouraged to practice the casting process and thereby improve their casting skills.

SUMMARY OF THE INVENTION

The present invention provides a casting target and a casting practice method which satisfy the needs mentioned above. The inventive casting target comprises receiving means for receiving an object cast at the receiving means and indicating means for indicating that the object has been received by the receiving means. The inventive method comprises the step of casting an object attached to a line at the receiving means of the inventive casting target.

Further objects, features, and advantages of the present invention will be apparent to those skilled in the art upon reference to the accompanying drawings and upon reading the following description of the preferred embodiments.

DESCRIPTION OF THE PREFERRED EMBODIMENTS

Figure 1:
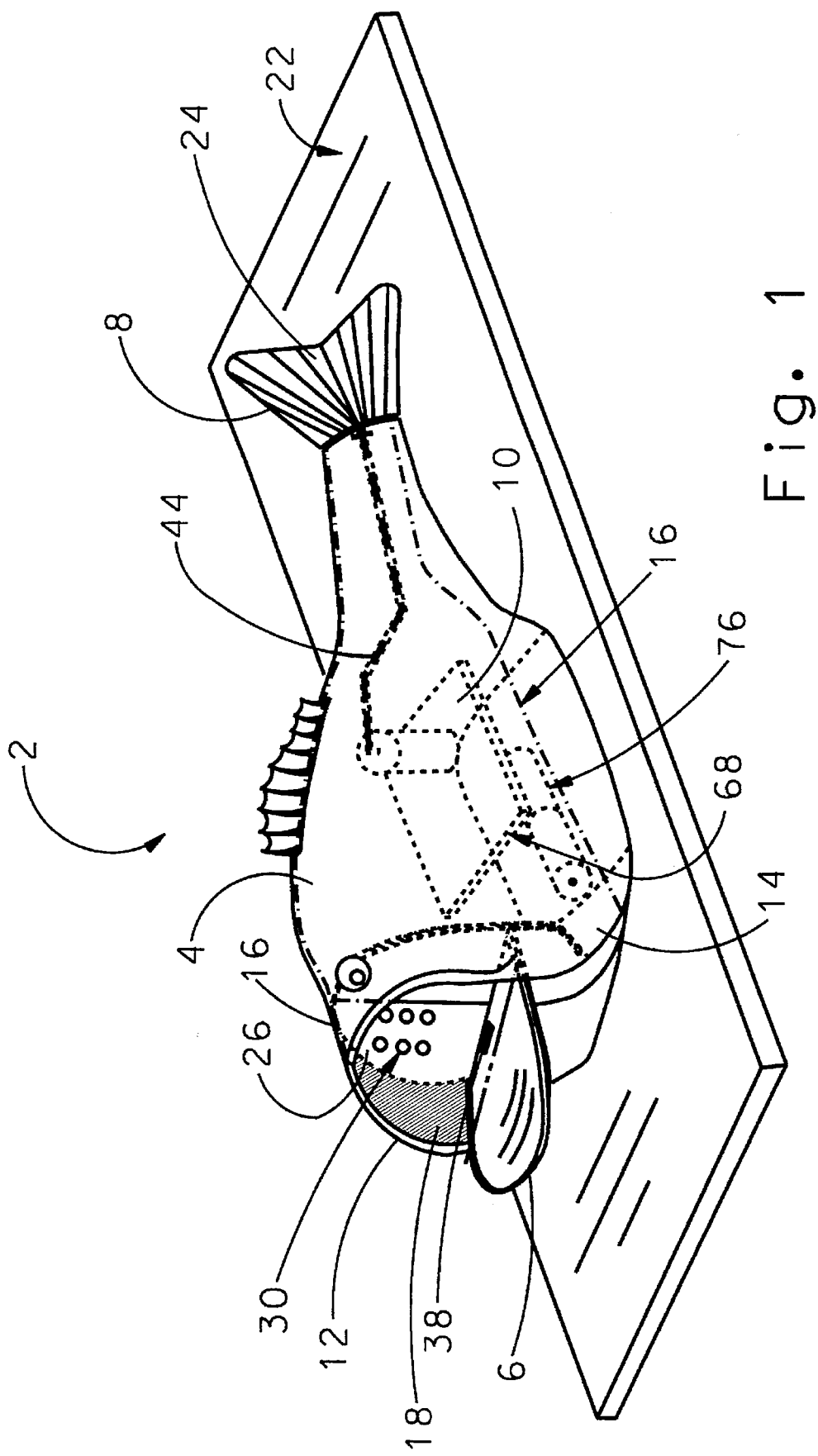
FIG. 1 provides a prospective view of an embodiment of the inventive casting target.
Figure 2:
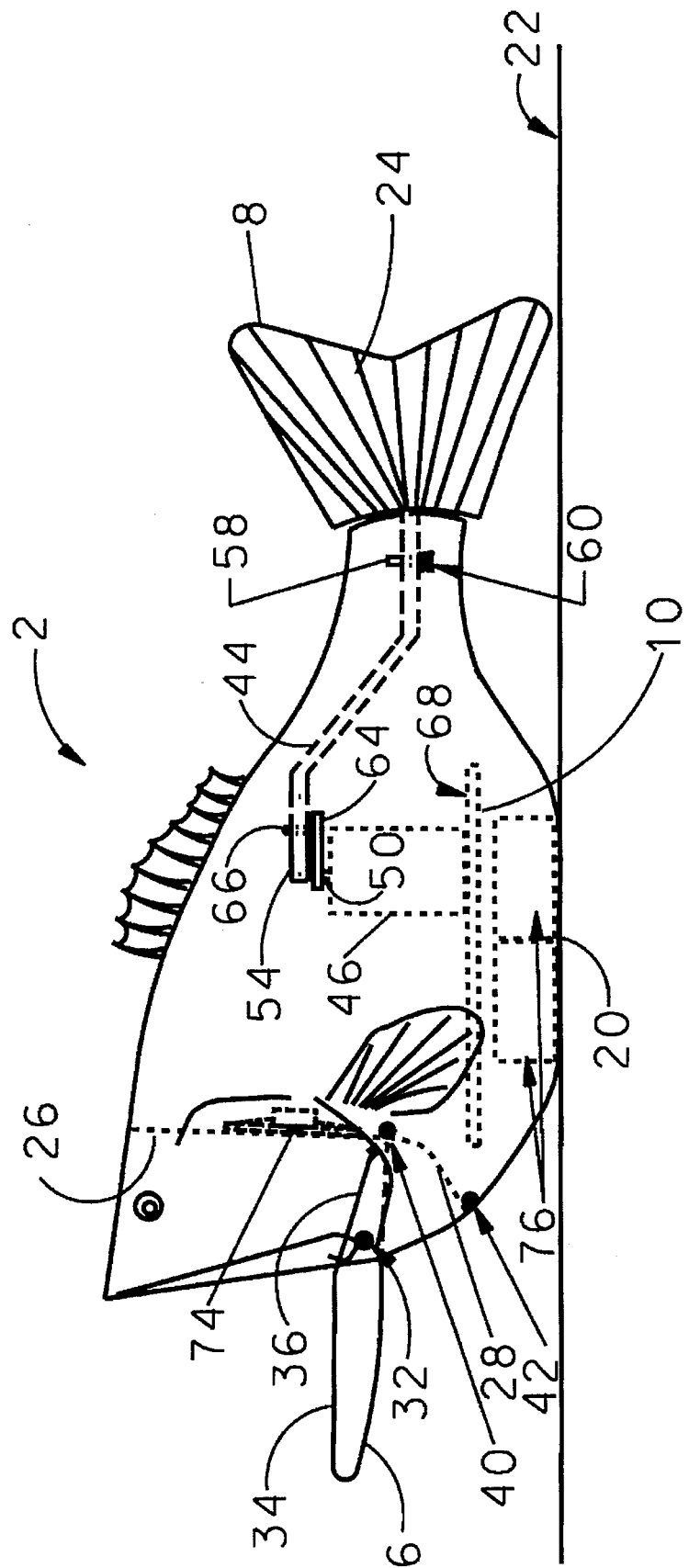
FIG. 2 provides an elevational side view of the inventive target 2.

An embodiment 2 of the inventive casting apparatus is depicted in FIGS. 1–2. Inventive target 2 comprises: a housing 4; a hinged lower jaw 6; a movable tail fin assembly 8; and an indicator circuit assembly 10.

Housing 4 is preferably shaped in the form of the body of a fish. Although substantially any sturdy material can be used in forming housing 4, housing 4 is preferably formed from a joined pair of plastic molded halves 12, 14. Halves 12 and 14 mate at body centerline 16 and can be secured together by the use of glue, molded snaps, screws, or generally any other means used in the art for combining molded pieces. Housing 4 preferably includes: a mouth-shaped cavity 18 for receiving a plug or other object cast toward target 2; an internal molded cavity for receiving and securing tail fin assembly 8 and indicator assembly 10; and a base 20 which will support target 2 on a flat surface 22 such that the bottom of the tail fin portion 24 of fin assembly 8 is operably spaced at least slightly above flat surface 22. Spacing the bottom of tail fin 24 above surface 22 allows tail fin 8 to move freely without interference from surface 22.

Mouth cavity 18 preferably includes a back wall 26 and a curved lower wall 28. Curved lower wall 28 is formed to correspond to the shape and rotational movement of hinged lower jaw 6. Back wall 26 preferably has speaker perforations 30 formed therein.

Hinged lower jaw 6 is pivotably connected to mouth cavity 18 by means of a pin 32 which extends through jaw 6 and is secured and pivotably received in cavities formed in the sides of mouth 18. Jaw 6 includes a large lip portion 34 which extends outwardly from pin 32 and a rear portion 36 which extends into mouth cavity 18. The weight of the outer lip portion 34 of jaw 6 is greater than the weight of rear jaw portion 36 such that, until an object of sufficient weight is received on rear portion 36, jaw 6 remains in the open position depicted in FIGS. 1 and 2.

Lower jaw 6 further includes a magnet 38 provided in rear portion 36. When lower jaw 6 is in an open position as shown in FIGS. 1 and 2, magnet 38 mates with and thereby closes a first Reed switch 40 provided in back wall 26 of mouth cavity 18. When jaw 6 rotates to a closed position, magnet 38 mates with and thereby closes a second Reed switch provided at the bottom of the curved lower wall 28. When magnet 38 mates with first Reed switch 40, second Reed switch 42 will be open. Correspondingly, when magnet 38 mates with second Reed switch 42, first Reed switch 40 will be open.

Tail fin assembly 8 preferably comprises: tail fin-shaped portion 24 positioned outside of housing 4; a fin shaft 44 which is rigidly connected to tail fin 24 and which extends into housing 4; an electric motor 46 mounted inside housing 4; and an operating linkage 48 which operably links the rotating shaft 50 of motor 46 to fin shaft 44.

Fin shaft 44 preferably comprises: a rear horizontal segment 52 connected to tail fin 24; a front horizontal segment 54 positioned above motor 46; and a sloped intermediate segment 56 extending between horizontal segments 52 and 54. Rear segment 52 preferably has a vertical pin 58 molded or otherwise attached thereto which is pivotably received in a slot 60 provided in the interior of housing 4 whereby shaft 44 will pivot at location 58. The forward horizontal segment 54 of shaft 44 has a slot 62 formed therein for operably associating shaft 44 with operating linkage 48.

Operating linkage 48 preferably comprises a horizontal member 64 having one end secured to motor shaft 50. Operating linkage 48 preferably further comprises a vertical pin 66 which extends upwardly from the other end of horizontal member 64 and which is slidably received in shaft slot 62. Thus, when motor 46 is activated, vertical pin 66 moves in a circular orbit and slides within slot 62 such that fin shaft 44 pivots at point 58. As a result, a wagging-type motion is imparted to tail fin 24.

Indicator circuit assembly 10 preferably comprises: a circuit board 68; a timer circuit 70 provided on circuit board 68; a sound producing circuit 72 provided on circuit board 68; a speaker 74 mounted behind mouth cavity back wall 26 adjacent to speaker perforations 30; batteries 76; and Reed switches 40 and 42.

Figure 3:
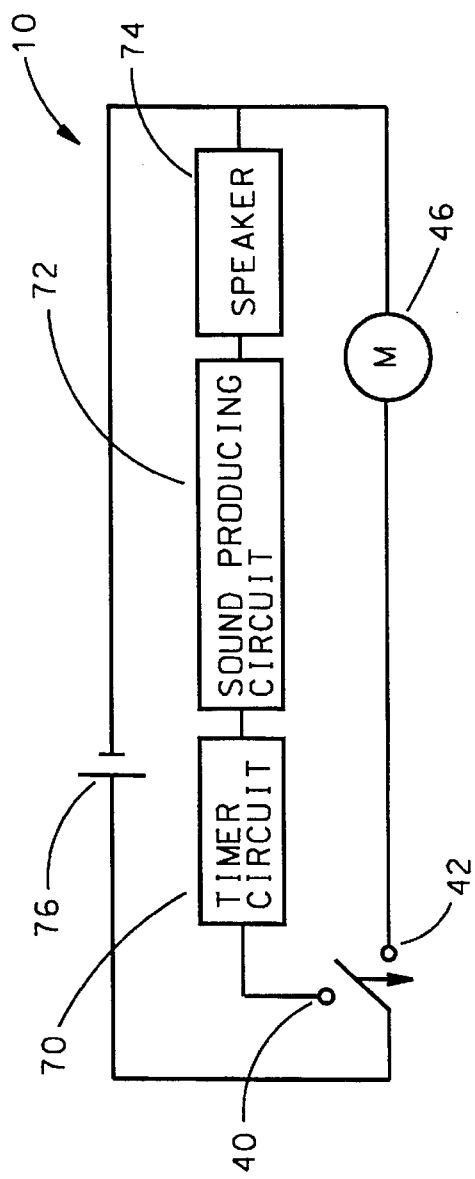
FIG. 3 provides a block diagram of an indicator circuit assembly used in the inventive target.
Figure 4:
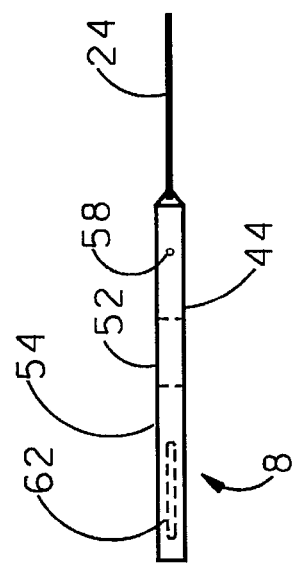
FIG. 4 provides a top view of a tail fin assembly used in the inventive target.

As shown in FIG. 3, indicator circuit assembly 10 preferably includes two circuits. The first circuit comprises batteries 76, motor 46, and second Reed switch 42. The second circuit preferably comprises: batteries 76; timer circuit 70; sound-producing circuit 72; speaker 74; and first Reed switch 40. Consequently, when hinged lower jaw 6 is in closed position, the first circuit is activated whereby tail fin 24 automatically moves in a wagging type motion. On the other hand, when lower jaw 6 is in open position, the second circuit is activated whereby a sound is automatically produced for a period of time determined by timer circuit 70.

The inventive method comprises the step of casting toward inventive target 2 a plug or other object secured to the end of a fishing line. The object need only be of sufficient weight such that, when received on rear portion 36 of jaw 6, the object causes lower jaw 6 to pivot to and remain in its closed position. Thus, while the object is contained within mouth cavity 18, the tail wagging circuit is activated whereby tail fin 24 automatically moves in a continuous wagging motion with respect to housing 4.

In the next step of the inventive method, the object is removed from mouth cavity 18 by simply pulling the fishing line. The total weight of target 2 will preferably be sufficient to prevent target 2 from moving when the object is pulled from mouth 18. Additionally, rubber or some other high friction material can be added to base 20 to resist movement of target 2.

When the object is pulled from mouth 18, lower jaw 6 is moved to its open position. Second Reed switch 42 is thereby opened such that the wagging motion of tail 24 automatically ceases. Additionally, with jaw 6 now placed in open position, first Reed switch 40 is closed such that the sound producing circuit is activated. Examples of sounds produced by the sound producing circuit could include: belching sounds, words, randomly selected messages, or generally any desired noise or message or combination of noises and messages.

As will also be understood, indicator circuit assembly 10 could include alternative and/or additional components such that (a) a second or alternative sounds is/are produced while the object is contained within mouth 18; (b) tail fin 24 wags after the object is removed from mouth 18; (c) lights are activated while the object is contained within mouth 18 or after the object is removed from mouth 18; and/or (d) generally any other audio and/or visual indication is provided as a result of the object being received in mouth 18. As another alternative, the inventive device could include audio or visual indicators which operate prior to the time the object is received in mouth 18 and are discontinued or changed when the object is received in mouth 18.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus, placeable on a substantially flat surface, for use as a casting target, said apparatus comprising:

a housing having an exterior shaped in the form of a body of a fish and having a base placeable on said surface;

receiving means, provided on said housing, for receiving an object cast at said receiving means, said receiving means being shaped in the form of a mouth of a fish; and indicating means for indicating that said object has been received by said receiving means, said indicating means comprising a fin-shaped structure movably secured to said housing and positioned with respect to said base such that, when said base is placed on said surface, said fin-shaped structure will be spaced above said surface and can therefore move without contacting said surface and moving means for causing said fin-shaped structure to move.

2. The apparatus of claim 1 wherein said indicating means further comprises first sound producing means for producing a first sound.

3. The apparatus of claim 2 wherein:

said indicating means further includes a second sound producing means for automatically producing a second sound only after said object is removed from said receiving means; and said first sound producing means is operable for automatically producing said first sound while said object is positioned in said receiving means.

4. The apparatus of claim 1 wherein said moving means is operable for automatically moving said fin-shaped structure while said object is positioned within said receiving means.

5. The apparatus of claim 1 wherein said moving means is operable for automatically moving said fin-shaped structure after said object is removed from said receiving means.

6. The apparatus of claim 1 wherein:

said receiving means includes a cavity operable for receiving said object and said apparatus further comprises opening and closing means for automatically substantially closing said cavity when said object is received in said cavity and for automatically opening said cavity when said object is removed from said cavity.

7. The apparatus of claim 6 wherein said opening and closing means is a rotatably hinged member having a first portion extending into said cavity and a second portion extending outwardly from said first portion such that, when said object is received in said cavity, said object will rest upon said first portion and thereby cause said hinged member to rotate to a closed position in which said second portion substantially covers said cavity.

8. The apparatus of claim 7 wherein said hinged member is balanced such that, when said object is removed from said cavity, said hinged member automatically rotates to an open position in which said second portion does not cover said cavity.

9. An apparatus, placeable on a substantially flat surface, for use as a casting target, said apparatus comprising:

a target body having a base placeable on said surface and a cavity for receiving an object cast into said cavity;

indicating means for indicating at least one of (a) a reception of said object by said cavity and (b) a removal of said object from said cavity; and an opening and closing member rotatably connected to said target body and having a first portion extending into said cavity and a second portion extending outwardly from said first portion such that, when said object is received in said cavity, said object will rest upon said first portion and thereby cause said opening and closing member to rotate to a closed position in which said second portion substantially covers said cavity, said opening and closing member being balanced such that, when said object is removed from said cavity, said opening and closing member automatically rotates to an open position in which said second portion does not cover said cavity.

10. The apparatus of claim 9 wherein:

said target body has an exterior shaped in the form of a body of a fish, said cavity is a mouth-shaped cavity, and said opening and closing member is shaped in the form of a lower jaw structure of a fish.

11. The apparatus of claim 9 wherein, when said object is attached to the end of a line and is cast into said cavity in substantially the same manner as the casting of a fishing lure, said target body will remain in substantially fixed position on said surface as said object is received in said cavity and as said opening and closing member is thereby rotated to said closed position.

12. The apparatus of claim 11 wherein, when said object is residing in said cavity and said opening and closing member is in said closed position, said object can be removed from said cavity by pulling said line and said target body will remain in substantially fixed position on said surface as said object is removed from said cavity and as said opening and closing means is thereby rotated to said open position.

13. The apparatus of claim 9 wherein:

said indicating means includes a Reed switch, and said apparatus further comprises a magnet positioned in said second portion of said opening and closing member such that, when said opening and closing member is placed in said closed position, said magnet closes said Reed switch and thereby activates said indicating means.

14. An apparatus for use as a casting target, said apparatus comprising:

a housing having an exterior shaped in the form of a body of a fish;

receiving means, provided on said housing, for receiving an object cast at said receiving means, said receiving means being shaped in the form of a mouth of a fish; and indicating means for indicating that said object has been received by said receiving means, said indicating means comprising first sound producing means for producing a first sound, said indicating means further including a second sound producing means for automatically producing a second sound only after said object is removed from said receiving means, and said first sound producing means is operable for automatically producing said first sound while said object is positioned in said receiving means.

15. The apparatus of claim 14 wherein said indicating means further comprises:

a fin-shaped structure movably associated with said housing and moving means for causing said fin-shaped structure to move.

* * * * *